United States Patent [19]

Squibb

[11] Patent Number: 5,499,184
[45] Date of Patent: Mar. 12, 1996

[54] POWER SWITCH CIRCUITRY FOR ELECTRICALLY ISOLATING THE POWER SWITCH FROM A POWER SUPPLY

[75] Inventor: George F. Squibb, Spring, Tex.

[73] Assignee: Compaq Computer Corp., Houston, Tex.

[21] Appl. No.: 188,095

[22] Filed: Jan. 28, 1994

[51] Int. Cl.$^6$ .................................................. H02M 3/335
[52] U.S. Cl. ............................. 363/100; 363/21; 363/95; 363/131
[58] Field of Search .................... 363/20, 21, 41, 363/49, 74, 78, 84, 89, 95, 97, 100, 123, 125, 131; 323/318, 349, 352; 364/480

[56] References Cited

U.S. PATENT DOCUMENTS

| | | | |
|---|---|---|---|
| 4,631,652 | 12/1986 | Wendt | 363/97 |
| 4,661,896 | 4/1987 | Kobayashi et al. | 363/95 |
| 4,930,062 | 5/1990 | Yamada | 323/349 |
| 5,008,829 | 4/1991 | Cox et al. | 364/480 |
| 5,029,269 | 7/1991 | Elliott et al. | 363/21 |
| 5,091,837 | 2/1992 | Duspiva et al. | 363/21 |
| 5,189,600 | 2/1993 | Keck et al. | 363/21 |
| 5,436,820 | 7/1995 | Furmanczyk | 363/49 |

OTHER PUBLICATIONS

Burke; "Low Voltage Control Circuit"; Jan. 1968, RCA TN No. 740.

*Primary Examiner*—Jeffrey L. Sterrett
*Attorney, Agent, or Firm*—Pravel, Hewitt, Kimball & Krieger

[57] ABSTRACT

A power switch circuit including a small signal transformer and a low power oscillator for detecting the power switch while isolating it from the primary of the power supply. When the power switch is off, or is otherwise pressed to turn off the power supply, the oscillator charges a capacitor. A sensing and control circuit coupled to the oscillator and capacitor grounds a vital signal of the power supply keeping the power supply turned off. In one embodiment, when the switch is turned on, it shorts the signal transformer disabling the oscillator, so that the capacitor is discharged and the sensing and control circuit releases the vital signal. In another embodiment, the power switch momentarily disables the oscillator and discharges the capacitor, so that the sensing and control circuit toggles a flip-flop circuit to turn on the power supply.

18 Claims, 4 Drawing Sheets

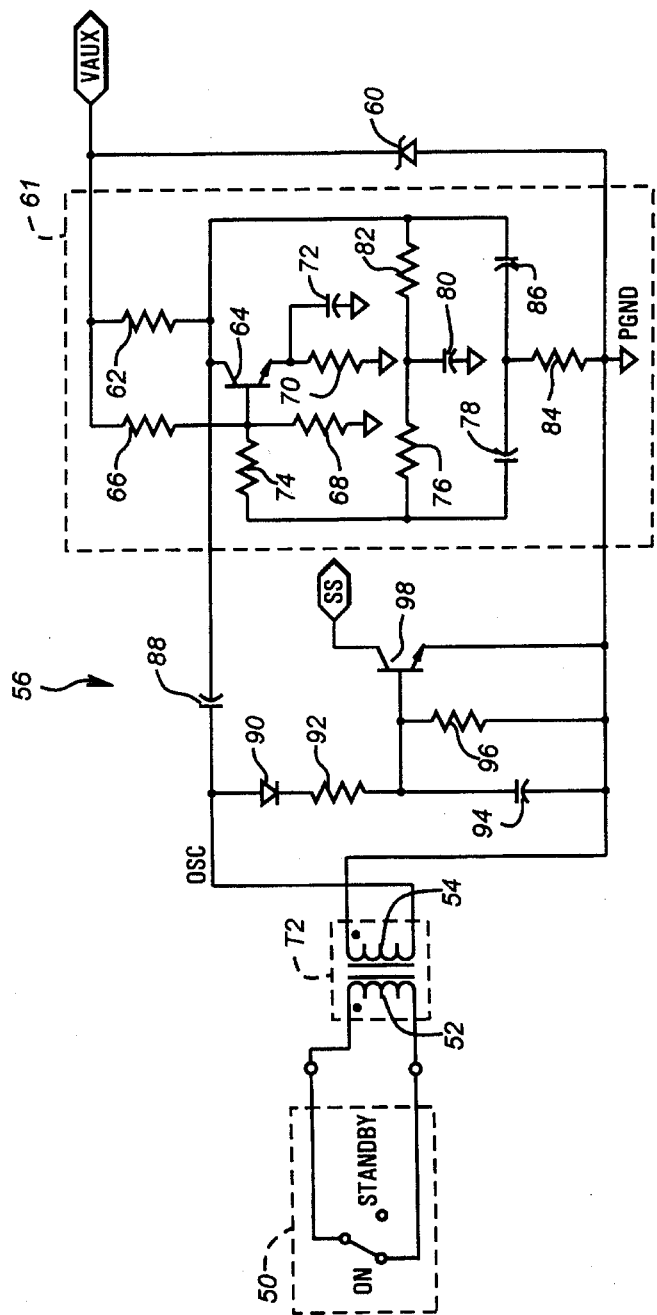
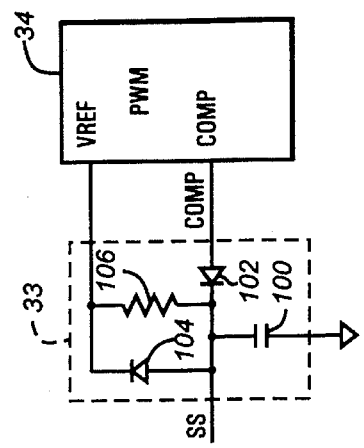
*FIG. 3A*
*FIG. 3B*

POWER SWITCH CIRCUITRY FOR ELECTRICALLY ISOLATING THE POWER SWITCH FROM A POWER SUPPLY

BACKGROUND OF THE INVENTION

1. Field of the Invention

The present invention relates to a power switching circuit for remotely activating a power supply, where the power switch is electrically isolated from the primary of the power supply.

2. Description of the Related Art

Most IBM compatible PCs have three separate physical devices, namely the keyboard, the monitor and the main computer or system unit. The system unit typically contains the processor, the data storage units, the power supply and other support circuitry. The main power switch for the computer system is typically located on the system unit for close proximity to the power supply, and to achieve as little exposure as possible of the operator to the voltages and currents associated with the power supply. This is a simple way to more easily comply with requirements promulgated by safety agencies.

The power supply includes a power transformer having a primary and a secondary side, where the primary side carries primary power comprising high voltage and current capacity that could harm the operator upon accidental contact. The secondary side carries much lower voltage and current capacity, where direct contact is relatively safe and not as harmful to the operator. The power switch must ultimately disable the circuitry on the primary side of the power supply transformer, so that placement on the system unit locates the switch near the power supply and limits the exposure of the operator to primary power only when interfacing the power switch. Otherwise, the operator interfaces mostly with the keyboard and mouse, which are directly coupled to the much safer secondary of the power supply.

Nonetheless, it is desirable to place the power switch at a more convenient location for the operator. If the switch remains on the system unit, the system unit must be conveniently located. To this end, the primary computer unit may be placed on the top of the operator's desk for easy access to the power switch, the floppy drives and other functions commonly associated with the system unit. It is common, however, to place the system unit on the floor to conserve desktop space, or when the unit is particularly designed for placement on the floor, such as tower configurations. In any event, the system unit must not be placed too far from the operator since the power switch should be readily accessible.

A better solution is to separate the main power switch from the system unit, without increasing risk of harm to the operator. Several methods have been used to solve this dilemma. Switching boxes may be purchased to handle all of the switching functions by providing a central location for all power switches, including switches for the main power supply, the monitor, and even a printer. One problem with this technique is that some switching units may still convey dangerous primary power close to the operator. Also, the switch box is often expensive, and usually consumes valuable space even if it is smaller than the primary unit.

Another solution is to electrically isolate the power switch from the power supply primary using isolation circuitry, where the isolation circuitry forms a safe boundary through magnetic, optical or even capacitive means. If so isolated, the power switch may be located at a convenient place, such as on the keyboard. Such electrical isolation is not easily achieved, however, and often adds other complications. For example, one design uses a separate power supply providing several watts of power to a separate secondary, where this secondary circuit remains powered all the time. This design requires a power transformer and optical means to cross the safety boundary. There are several problems with this technique. First, the power transformer typically operates at 60 Hertz (Hz) causing electromagnetic interference (EMI) noise problems due to the switching frequency. Thus, the separate power transformer transmits noise even when the computer system is off. Also, the power transformer consumes valuable space within the computer and is provided only at a significant cost. Furthermore, the power transformer consumes valuable energy since it is always powered on, absorbing several watts of power even while the computer is not in use and supposedly "off."

Therefore, it is desirable to provide an inexpensive way for turning on and off the power supply at a convenient location, while also providing a safety barrier between the power supply and the operator, and without consuming substantial power or generating radiated noise.

SUMMARY OF THE PRESENT INVENTION

Remote power switch circuitry according to the present invention includes a small signal transformer and a low power oscillator for detecting the state of the main power switch and for providing the necessary electrical isolation between the dangerous voltages of the primary of the power supply and the power switch. A very simple voltage regulator converts the unregulated primary DC voltage to a small DC voltage for providing power to the oscillator. The oscillator remains powered on while the power supply is off, but consumes a very low amount of power. The oscillator preferably outputs a sine wave, which is rectified to develop a DC voltage across a capacitor. The sine wave is low power and preferably has a frequency of between 10-20 kHz, so that there is very little electrical noise. The rectifier and capacitor are also electrically coupled in parallel with one side of the signal transformer, where the other side of the signal transformer is coupled to the power switch. The signal transformer thus isolates the power switch and the operator from the power supply primary electronics.

In a first embodiment, the capacitor voltage activates a transistor switch when the power switch is off, where the charged capacitor pulls a vital signal in the primary of the power supply to ground, disabling the power supply. In the preferred embodiment, this vital signal is the compensation input pin of a pulse width modulation (PWM) circuit of a switching power supply, although other vital signals could be grounded. For example, a signal which prevents the PWM from oscillating when grounded, or which grounds or isolates a feedback signal from the output to the PWM could alternatively provide a means for turning off the power supply. The power switch is a single-pole single-throw switch, where the primary of the signal transformer is shorted when the switch is placed in the on position. This collapses the voltage across the secondary of the signal transformer, disabling the oscillator, discharging the capacitor and thus turning off the transistor switch. Thus, when the transistor switch is turned off, it open circuits and releases the vital signal and the power supply powers up and operates in a normal manner. When the power switch is placed in the off position, the oscillator once again charges the capacitor, which turns on the transistor switch and grounds the vital signal.

In a more complicated embodiment, the power switch is a normally-open momentary contact switch, which activates a pulse from a one-shot multi-vibrator across the signal transformer whenever the switch is pressed. The primary of the signal transformer is shorted momentarily, disabling the oscillator in a similar manner as described for the first embodiment, except that the capacitor is only momentarily discharged. A comparator coupled to the capacitor detects the momentary discharge of the capacitor and asserts a clock pulse to a flip-flop circuit. The state of the flip-flop circuit tracks whether the power supply is on or off and controls the vital signal of the PWM as described previously. Again, the vital signal is preferably the compensation signal, although other vital signals are contemplated. In this embodiment, the oscillator receives power from a simple voltage regulator as before, but also provides power across the signal transformer to a rectifier circuit, which powers the multi-vibrator circuit electrically coupled to the power switch. The duration of the multi-vibrator pulse is preferably not appreciable, so that the power to the multi-vibrator circuit is not interrupted.

The switch circuitry according to the present invention isolates the power switch from the harmful voltages of the power supply primary. This allows the power switch to be located at a convenient location for the operator, such as the keyboard of a computer system, without the risk of exposing the operator to the dangerous power supply voltage levels. Since a low power isolator and small signal transformer is used, the switch circuitry according to the present invention consumes very little power when the power supply is off, and is very easy and inexpensive to implement. Also, the frequency of the oscillator is chosen to cause very little EMI radiation.

BRIEF DESCRIPTION OF THE DRAWINGS

A better understanding of the present invention can be obtained when the following detailed description of the preferred embodiment is considered in conjunction with the following drawings, in which:

FIGS. 3A and 3B are schematic diagrams of one embodiment of a power switching circuit according to the present invention.

DETAILED DESCRIPTION OF THE PREFERRED EMBODIMENT

Figure 1:
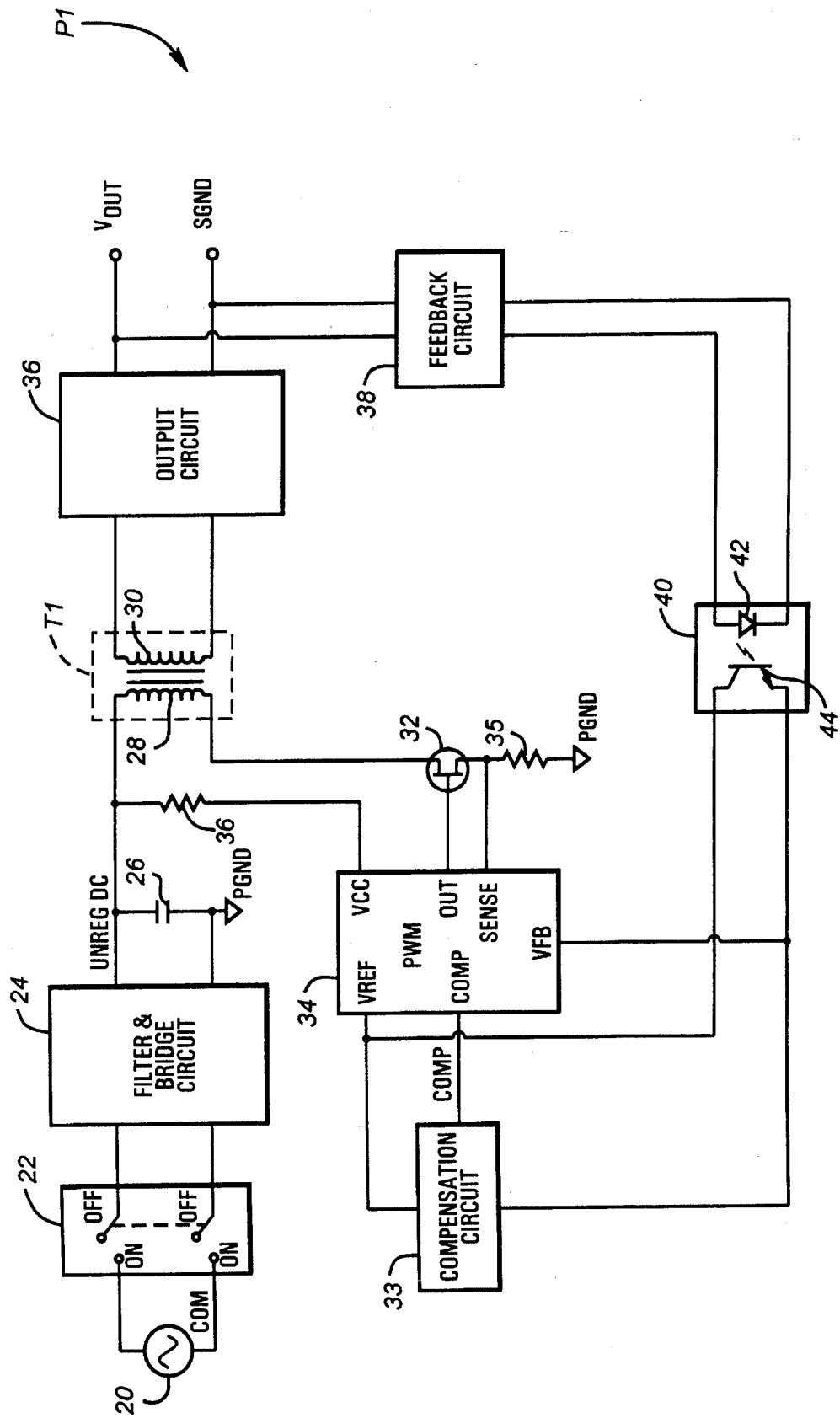
FIG. 1 is a simplified block diagram of a power supply using a power switch connected according to prior art.

Referring now to FIG. 1, a simplified block diagram is shown of a power supply P1 using a power switch 22 implemented according to prior art. An AC source 20 is coupled to the input of a filter/bridge circuit 24 through the power switch 22. The power switch 22 is typically a double-pole double-throw switch coupled to both sides of the AC source 20, so that when the power switch 22 is in the off position, it disconnects the AC source 20 from the filter/bridge 24 thereby turning off the power supply P1. When the switch 22 is placed in the on position, the AC source 20 is connected to the filter/bridge circuit 24 thereby empowering the power supply P1. The filter/bridge circuit 24 preferably includes an EMI filter for preventing noise generated by the power supply P1 from being transmitted to the AC source 20, and a fullwave bridge rectifier for converting AC voltage to DC voltage. The filter/bridge circuit 24 provides an unregulated DC voltage between a signal UNREG DC and primary ground, referred to as PGND, across a bulk capacitor 26. The UNREG DC signal typically has a voltage of approximately 100–500 volts and a large current capacity. It is desired that an operator of a computer system or other electronic device using the power supply P1 does not come into contact with the UNREG DC signal or the voltages generated by the AC source 20.

The UNREG DC signal is connected to one side of a primary inductor 28 of a power transformer T1, where the other side of the inductor 28 is coupled to the current path of a switch 32. The transformer T1 is the main power transformer of the power supply P1 having a secondary inductor 30. The secondary inductor 30 is electrically isolated from the primary inductor 28, although the inductors 28, 30 are inductively coupled for transfer of power. The other end of the current path of the switch 32 typically connected to a current sensor 35, having its other end connected to ground. The current sensor 35 provides a current sense signal to, and the switch 32 receives a control signal from a pulse width modulation (PWM) circuit 34. The switch 32 is typically a MOSFET (metal-oxide semiconductor field effect transistor) for use in switching power supplies as known to those having ordinary skill in the art. The PWM 34 generally receives initial bootstrap power from the UNREG DC signal through a current limit resistor 36. The transformer T1 preferably includes an auxiliary winding (not shown) to provide power to the PWM 34 during normal operation, whereas the UNREG DC signal typically only provides initial bootstrap power through the resistor 36. However, the auxiliary winding of the transformer T1 is not shown for purposes of simplicity.

The PWM 34 is connected to PGND and preferably receives a feedback signal between its COMP or comparator output and VFB or voltage feedback input. An oscillator circuit (not shown) may also be included to establish the operating frequency for the PWM 34. The PWM 34 uses the oscillator circuit, the feedback signal and the sense signal information to develop and generate a pulse signal, which is provided to the switch 32. This pulse signal continuously turns on and off the switch 32, so that when the switch 32 is on, current flows through the primary inductor 28 from the UNREG DC signal, and when off, the switch 32 terminates current through the primary inductor 28. The frequency of the pulse signal is either fixed by the oscillator circuit or variable depending upon the mode of operation of the power supply P1. The duty cycle is varied depending upon the feedback signal. Energy is either stored in the transformer T1 (flyback mode) or is transferred to the secondary inductor 30 (forward mode) depending upon the topology of the power supply P1. The voltage developed across the secondary inductor 30 is provided to an output circuit 36, which develops the output DC voltage, referred to as VOUT, relative to a secondary ground signal SGND.

The VOUT and SGND signals are provided to the inputs of a feedback circuit 38, which provides output signals to an opto-coupler 40. In particular, the feedback circuit 38 is connected across a light emitting diode (LED) 42 within the opto-coupler 40, where the LED 42 provides a light signal based on the voltage of the VOUT signal to the base of a bipolar transistor 44, also within the opto-coupler 40. The collector of the transistor 44 is preferably connected to a VREF output and the emitter is connected to the VFB input of the PWM 34. The VREF output of the PWM 34 is preferably a reference voltage of approximately 5 volts. A compensation circuit 33, preferably including resistors, diodes and capacitors, is connected to the VREF output and VFB input and receives a signal COMP from the COMP output of the PWM 34. In this manner, the PWM 34 can detect the level of the output signal VOUT through the feedback circuit 38, the opto-coupler 40 and the compensation circuit 33 to control the switch 32 as known to those skilled in the art. It is noted that the COMP and VFB terminals are used in a variety of different ways depending upon the particular type of PWM 34 and the mode of operation. Thus, the opto-coupler 40, the compensation circuit 33 and the oscillator circuit, if any, may be connected in several different ways and designed differently. Nonetheless, the basic principles of operation are similar.

It is appreciated that the secondary circuit is completely isolated from the primary circuit through the transformer T1 and the opto-coupler 40. The keyboard (not shown) of a computer system is electrically coupled through the secondary of the power supply P1, while the power switch 22 is obviously connected to the primary. Thus, the operator is exposed to the primary voltages of the power supply P1 when turning on the switch 22.

Figure 2:
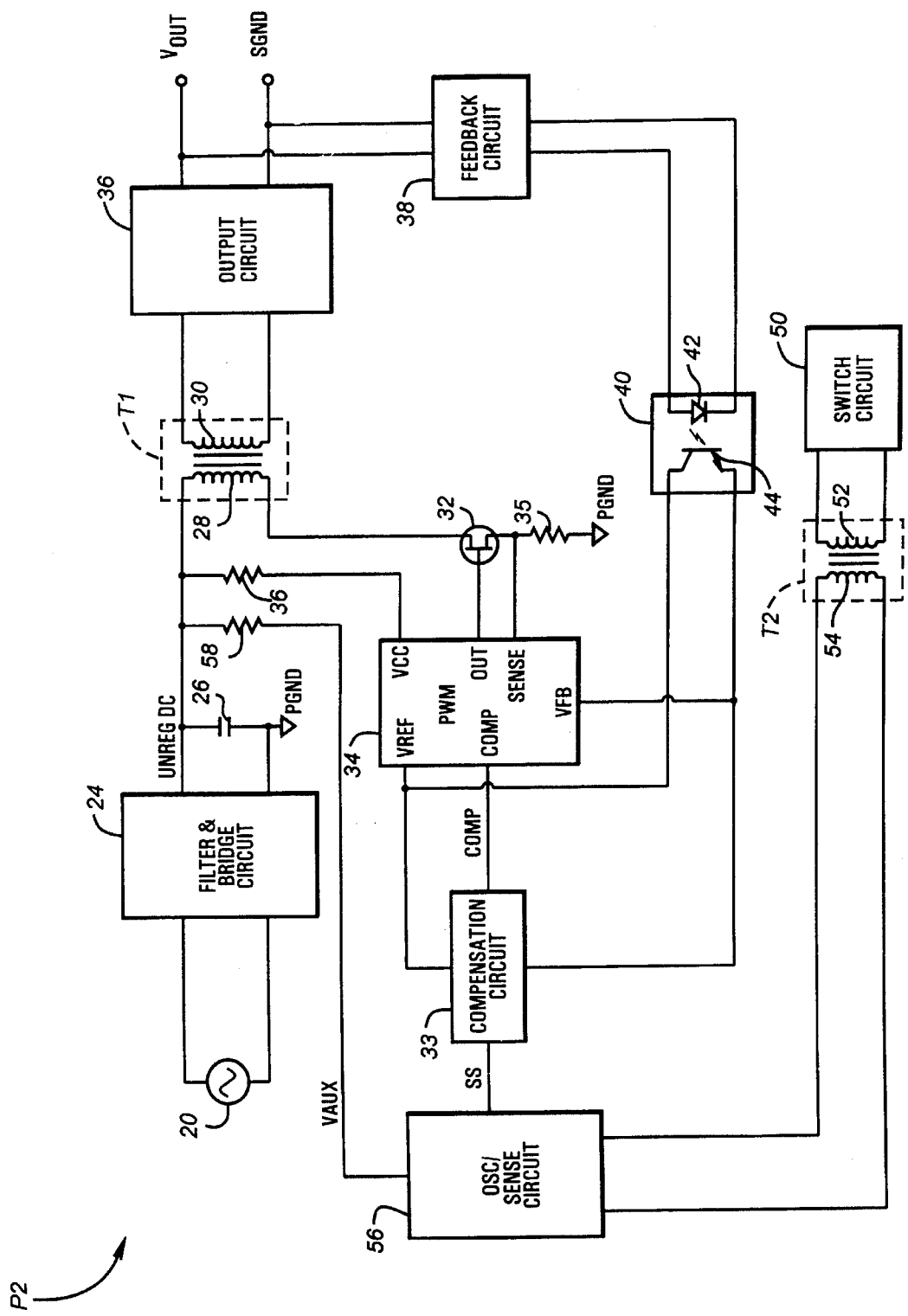
FIG. 2 is a simplified block diagram of a power supply using a power switching circuit according to the present invention.

Referring now to FIG. 2, a simplified block diagram of a power supply P2 including a power switching circuit according to the present invention is shown. Similar components to that of the power supply P1 are included, which have identical reference numerals. Again, the AC source 20 is included but is directly coupled to the filter/bridge circuit 24. The power switch is incorporated into a switch circuit 50. The operation of the remaining components is essentially identical, except for the additional switching circuitry according to the present invention. The switch circuit 50 is included for turning on and off the power supply P2, and preferably includes a power switch remotely located for convenient access by the operator of the computer system. The switch circuit 50 is coupled across the primary inductor 52 of a signal transformer T2. The transformer T2 includes a secondary inductor 54, which is coupled to an oscillator/sense circuit 56. The oscillator/sense circuit 56 receives power from a signal VAUX, which is developed from the UNREG DC signal through a current limit resistor 58.

The oscillator/sense circuit 56 provides an output signal, referred to as SS, to the compensation circuit 33 for controlling the level of the COMP signal. As will be described more fully below, when the power supply P2 is off, the oscillator/sense circuit 56 grounds the SS signal, thereby pulling the COMP signal low. This effectively shuts down or turns off the power supply P2. The oscillator/sense circuit 56 detects the assertion or change in the state of the power switch of the switch circuit 50 through the transformer T2, indicating that the operator wishes to turn on the power supply P2. If so, the oscillator/sense circuit 56 preferably open circuits the SS signal to release the COMP signal to the PWM 34 for normal operation. The operator subsequently presses the power switch of the switch circuit 50 to turn off the power supply P2, as sensed by the oscillator/sense circuit 56. Once again, the oscillator/sense circuit 56 grounds the SS and COMP signals to shut off the power supply P2. Thus, the COMP signal is a vital signal used in the preferred embodiment for disabling the power supply P2. It is noted, however, that other vital signals could be used, such as a feedback signal from the opto-coupler 40 or provided to the VFB input, or an oscillation signal within the oscillator circuit. Thus, use of any vital signal that effectively disables the power supply P2 is contemplated by the present invention.

FIGS. 3A and 3B show schematic diagrams of one embodiment of a switching circuit according to the present invention. Referring now to FIG. 3A, the switch circuit 50 simply comprises a single-pole single-throw switch coupled directly across the primary inductor 52 of the transformer T2. The power switch 50 in this case is conveniently located for access by the operator, such as on the keyboard or front panel of a computer system and can be a small, inexpensive, low voltage, low current switch.

The VAUX signal is coupled to the cathode of a Zener diode 60, having its anode connected to PGND. The Zener diode 60 and the resistor 58 form a simple voltage regulator, which preferably regulates the voltage of the VAUX signal to approximately 13 volts. This applies the appropriate low voltage and low current power necessary for a sine wave oscillator 61, which forms part of the oscillator/sense circuit 56.

The VAUX signal is coupled to one end of a resistor 62 and to one end of a resistor 66. The other end of the resistor 62 is coupled to the collector of an NPN bipolar transistor 64, and the other end of the resistor 66 is connected to the base of the transistor 64. The base of the transistor 64 is connected to one end of resistor 68, having its other end connected to PGND. The emitter of the transistor 64 is connected to one end of a resistor 70 and to one end of a capacitor 72, where the other ends of the resistor 70 and the capacitor 72 are connected to PGND. The base of the transistor 64 is connected to one end of a resistor 74, having its other end connected to one end of a resistor 76 and to one end of a capacitor 78. The other end of the resistor 76 is connected to one end of a capacitor 80 and to one end of a resistor 82, and the other end of the capacitor 80 is connected to PGND. The other end of the resistor 82 is connected to the collector of the transistor 64. The other end of the capacitor 78 is connected to one end of a resistor 84 and to one end of a capacitor 86. The other end of the resistor 84 is connected to PGND and the other end of the capacitor 86 is connected to the collector of the transistor 64.

The resistors 62, 66, 70, 74, 76, 82 and 84, the capacitors 72, 78, 80 and 86 and the transistor 64 form the sine wave oscillator 61, which generates a low power sine wave output at the collector of the transistor 64. The sine wave generated by the oscillator 61 has a frequency preferably within the range of 10–20 kilo-Hertz (kHz) and a maximum power of approximately 1–20 milliwatts (mW). Since the oscillator 61 is the only device operating when the power supply P2 is off, it is appreciated that it consumes very little power and generates very little EMI noise. Any other low frequency/power oscillator may be used providing a sine wave or other types of oscillating outputs, such as square waves or triangular wave outputs. A sine wave is preferred since it is lower power and has less frequency content.

The collector of the transistor 64 is connected to one end of a coupling capacitor 88, having its other end providing a signal OSC to one end of the secondary inductor 54. The coupling capacitor 88 removes any DC voltage from the output of the oscillator 61. The other end of the secondary inductor 54 is connected to PGND. The OSC signal is provided to the anode of a diode 90, having its cathode connected to one end of a resistor 92. The other end of the resistor 92 is connected to one end of a capacitor 94, to one end of a resistor 96 and to the base of an NPN bipolar transistor 98. The other ends of the capacitor 94 and the resistor 96 and the emitter of the transistor 98 are connected to PGND. The collector of the transistor 98 is connected to and controls the SS signal, which is used to control the COMP signal.

Referring now to FIG. 3B, a schematic diagram is shown illustrating the connection between the SS signal and the COMP output of the PWM 34, where these connections form part, but not necessarily all, of the compensation circuit 33. The remaining portion of the compensation circuit 33 is omitted for simplicity and is not necessary for complete disclosure of the present invention. The SS signal is connected to one end of a capacitor 100, to the cathode of a diode 102, to the anode of a diode 104 and to one end of a resistor 106. The anode of the diode 102 is the COMP signal provided by the COMP output of the PWM 34. The cathode of the diode 104 and the other end of the resistor 106 are connected to the VREF terminal of the PWM 34. In this manner, the VREF signal provides collector voltage to the transistor 98 through the resistor 106. When the transistor 98 is turned on, grounding the SS signal, the capacitor 100 is shorted and the COMP signal is pulled to ground, disabling the PWM 34. When the transistor 98 is turned off, the SS signal is pulled high through the resistor 106 and a voltage develops across the capacitor 100, which isolates the COMP signal from the SS signal. This allows the PWM 34 to operate in normal manner.

When the power switch 50 is in the standby or off position, the primary inductor 52 is open circuited so that the secondary inductor 54 provides a high impedance. In this manner, oscillator 61 operates normally, so that the sign wave developed on the OSC signal is half-waved rectified by the diode 90. A constant DC voltage is developed across the capacitor 94, activating the transistor 98 on and grounding the SS signal. This disables the PWM 34 and turns off the power supply P2. When the switch 50 is placed in the on position, the primary inductor 52 is shorted so that a low impedance is provided across the secondary inductor 54, essentially grounding the OSC signal. When the OSC signal is grounded, the output of the oscillator 61 is grounded so that voltage is no longer supplied to the capacitor 94. Thus, the capacitor 94 discharges through the resistor 96. The voltage of the capacitor drops, turning off the transistor 98. The SS signal is left floating through the open collector of the transistor 98. Thus, when the switch 50 is in the on position, the oscillator 61 is grounded and the transistor 98 is turned off, allowing the PWM 34 to operate normally. This turns on the power supply P2.

Figure 4:
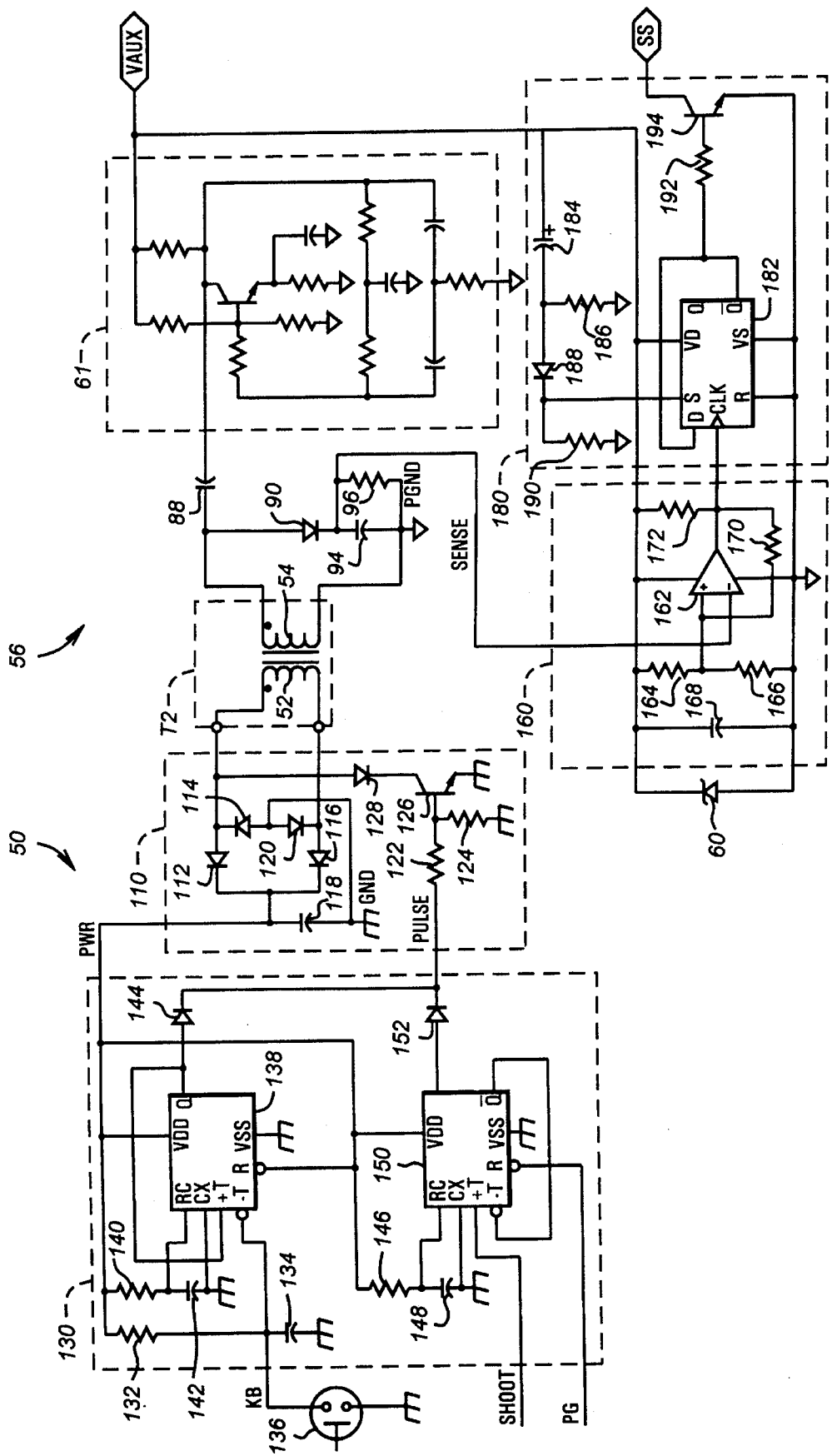
FIG. 4 is an alternative embodiment of a power switching circuit according to the present invention.

Referring now to FIG. 4, an alternative embodiment of a power switching circuit according to the present invention is shown. The switch circuit 50, the small signal transformer T2 and the oscillator/sense circuit 56 are shown, although the switch circuit 50 and oscillator/sense circuit are different. The VAUX signal is again provided from the UNREG DC signal through the current limit resistor 58 and applied across a Zener diode 60 for establishing a low voltage of preferably approximately 13 volts at the VAUX signal. The VAUX signal is provided to the sine wave oscillator 61 as described before. Again, the sine wave oscillator 61 provides a relatively low power, low frequency sine wave, and other similar oscillator designs may be used. Again, the sine wave oscillator 61 provides an output to the coupling capacitor 88, which provides the OSC signal in a similar manner as described previously. Also, the OSC signal is again rectified through the diode 90 to charge a capacitor 94, except that the resistor 92 is not needed, so that the cathode of the diode 90 is connected directly to the capacitor 94. The OSC signal and GND are connected across the secondary inductor 54 of the transformer T2 as before. The junction between the cathode of diode 90 and the capacitor 94 provides a signal referred to as SENSE, and the resistor 96 is connected between the SENSE and PGND signals. The diode 90, the capacitor 94 and the resistor 96 operate in a very similar manner as described for FIG. 3A. Thus, while the oscillator 61 is operating, its output is rectified through the diode 90 charging the capacitor 94, so that the SENSE signal is high. Also, while the primary inductor 52 is momentarily shorted, the capacitor 94 discharges through the resistor 96, so that the SENSE signal is negated low.

The primary inductor 52 of the transformer T2 is connected to the switch circuit 50, which, in this embodiment, comprises a power circuit 110, a multivibrator circuit 130 and a power switch 136. One side of the primary inductor 52 is connected to the anode of a diode 112, having its cathode connected to the cathode of a diode 116 and to one side of a capacitor 118. The other end of the secondary inductor 52 is connected to the anode of the diode 116 and the other end of the capacitor 118 is connected to chassis GND. The cathode of a diode 114 is connected to the anode of the diode 112 and the cathode of a diode 120 is connected to the anode of the diode 116, where the anodes of the diodes 114 and 120 are connected to chassis GND. In this manner, when the primary inductor 52 is not shorted, the diodes 112, 114, 116 and 120 serve as a fullwave rectifier for the sine wave voltage appearing across the secondary inductor 52 forming a DC signal referred to as PWR, which is filtered by the capacitor 118. The PWR signal is provided to the multivibrator circuit 130.

The multivibrator circuit 130 provides a signal PULSE to one side of a resistor 122 within the power circuit 110, where the other side of the resistor 122 is connected to one end of a resistor 124 and to the base of an NPN bipolar transistor 126. The other side of the resistor 124 and the emitter of the transistor 126 are connected to chassis GND. The collector of the transistor 126 is connected to the cathode of a diode 128, having its anode connected to the anode of the diode 112. In this manner, if the PULSE signal is negated low, the transistor 126 is turned off so that the sine wave voltage developed across the secondary inductor 52 operates normally, generating a voltage on the PWR signal. However, if the PULSE signal is asserted high, the transistor 126 is turned on, short circuiting the secondary inductor 52, essentially grounding the OSC signal.

The PWR signal is provided to one end of a resistor 132 of the multivibrator circuit 130, where the other end of the resistor 132 receives a signal KB, which is connected to one end of a filter capacitor 134. The other end of the capacitor 134 is connected to chassis GND. The KB signal is received from the power switch 136, having its other contact connected to chassis GND. The power switch 136 is preferably a normally-open momentary contact switch, and is preferably located on the keyboard for convenient access by the operator of the computer system. When the operator presses the button on the switch 136, the KB signal is temporarily grounded to chassis GND. When released, the KB signal rises due to charging of the capacitor 134 by the PWR signal through the resistor 132.

The KB signal is provided to the negative trigger input of a multivibrator 138, which is powered between the PWR signal and chassis GND. The multivibrator 138 is preferably the 14538B one-shot multivibrator by Motorola, although other similar types of one-shot multivibrators may be used. The positive trigger input of the multivibrator 138 is connected to its Q output to prevent re-triggering the multivibrator 138 while an output pulse is provided. The PWR signal is provided to the inverted reset input of the multivibrator 138, so that the Q output of the multivibrator 138 is initially negated low until the PWR signal is developed. The PWR signal is provided to one end of a resistor 140, having its other end connected to one end of a capacitor 142 and to the RC input of the multivibrator 138. The other end of the capacitor 142 is connected to chassis GND and to the CX input of the multivibrator 138.

In this manner, if the operator presses the switch 136 grounding the KB signal, the multivibrator 138 detects a negative pulse and asserts a positive pulse at its Q output, having a duration that depends upon the values of the resistor 140 and the capacitor 142. This pulse is applied to the anode of a diode 144, having its cathode providing the PULSE signal. Thus, when the switch 136 is pressed, the PULSE signal is asserted high, shorting the primary inductor 52 causing low impedance of the secondary inductor 52 of the transformer T2, where the duration of the pulse on the PULSE signal is sufficient to discharge the capacitor 94 through the resistor 96. This causes the SENSE signal to be momentarily negated low. However, the PULSE signal is preferably not long enough to lower the PWR signal appreciably, so that power is not removed from the multivibrator 138. After the PULSE signal is completed, the OSC signal once again charges the capacitor 94 through the diode 90.

The PWR signal is also provided to one end of a resistor 146, having its other end connected to one end of a capacitor 148 and to the RC input of another multivibrator 150, which is similar to the multivibrator 138. The other end of the capacitor 148 is connected to chassis GND and to the CX input of the multivibrator 150. The positive trigger input of the multivibrator 150 receives a signal SHOOT, and the negative Q output of the multivibrator 150 is provided to its negative trigger input. The inverted reset input of the multivibrator 150 is connected to a power good signal, referred to as PG. The Q output of the multivibrator 150 is provided to the anode of a diode 152, having its cathode connected to the PULSE signal. In this manner, if the SHOOT signal is asserted high, a pulse is asserted on the PULSE signal in a similar manner as described for the multivibrator 138. The duration of the pulse depends on the values of the resistor 146 and the capacitor 148, and again is sufficient to temporarily pull the SENSE signal low, but not long enough to allow the PWR signal to drop by a significant amount. The multivibrator 150 is reset while the PG signal is negated, where the PG signal is negated by the computer system until the 5 volt output of the power supply P2 (not shown) is within specification. The circuitry of the multivibrator 150 is not necessary for purposes of the present invention, but provides a convenient way for other circuitry, or even the software, by controlling the SHOOT signal to remotely shut down the power supply P2. Thus, the multivibrator 150 is used primarily for software shut off of the computer system.

The SENSE signal is provided to a sense circuit 160 for detecting momentary negation of the SENSE signal. In particular, the SENSE signal is provided to the negative input of comparator 162, which receives power between the VAUX signal and PGND. The VAUX signal is provided to one end of a resistor 164 and to one end of a capacitor 168, where the other end of the resistor 164 is connected to one end of a resistor 166 and to the positive input of the comparator 162. The other ends of the capacitor 168 and the resistor 166 are connected to PGND. The output of the comparator 162 is connected to one end of a resistor 172 and to one end of a resistor 170. The other end of the resistor 172 is connected to the VAUX signal providing a pullup for the output of the comparator 162, and the other end of the resistor 170 is connected to the positive input of the comparator 162 for feedback. In this manner, a reference voltage is established between the resistors 164 and 168, which is compared to the SENSE signal, so that when the SENSE signal goes low, the output of the comparator 162 is asserted high.

The output of the comparator 162 is connected to the clock input of a D-type flip-flop 182 of the flip-flop circuit 180. The VAUX signal is provided to one end of a capacitor 184, having its other end connected to one end of a resistor 186 and to the anode of a diode 188. The other end of the resistor 186 is connected to PGND and the cathode of diode 188 is connected to one end of a resistor 190 and to the set input of the flip-flop 182. The other end of the resistors 186 and 190 are connected to GND. If the VAUX signal is low and begins to rise, such as when the power supply P2 is initially plugged in or if a temporary power failure occurs, a positive pulse is provided to the set input of the flip-flop 182, initializing the Q output and negative Q output to high and low, respectively. The negative Q output of the flip-flop 182 is connected to its D input, so that its state always toggles when clocked. The negative Q output is connected to one end of a resistor 192, and the other end of the resistor 192 is connected to the base of an NPN bipolar transistor 194, having its emitter connected to PGND and its collector providing the SS signal. The reset input of the flip-flop 182 is connected to PGND. A compensation circuit similar to the compensation circuit 33 shown in FIG. 3B connects the SS signal to the COMP signal. In the embodiment shown in FIG. 4, consecutive presses of the power switch 136 toggle the state of the flip-flop 182, alternatively grounding and releasing the SS signal. This allows turning on and off the power supply P2 and the computer system.

It is now appreciated that a power switching circuit according to the present invention provides the capability to turn on and off a power supply with a power switch isolated from the primary portion of the power supply. A signal transformer provides the necessary isolation of the power switch, and together with a low power oscillator, provides the detection of the power switch. Sensing and control circuitry coupled to the oscillator controls a vital signal of the power supply primary to turn on or off the power supply. In one embodiment, a two-state power switch is used and in another embodiment, the power switch is a momentary contact switch. In either embodiment, a switching circuit according to the present invention provides a low cost, low power and low EMI noise method of isolating the power switch, and thus the operator, from the dangerous voltages of the power supply.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

I claim:

1. A power switching circuit for turning on and off a power supply, the power supply including a power transformer having a primary and a secondary inductor, wherein the primary inductor is coupled to an unregulated DC input voltage and a pulse width modulation circuit for transferring power to an output circuit coupled to the secondary inductor of the power transformer, wherein the output circuit provides a feedback signal to a feedback compensation circuit, which develops a vital signal for controlling the pulse width modulation circuit, and wherein the power supply is turned off upon grounding the vital signal, but otherwise operates normally, said power switching circuit comprising:

a voltage regulator coupled to the unregulated DC input voltage for developing a low power DC signal;

an oscillator coupled to said voltage regulator for generating an oscillating signal;

means coupled to said oscillator for converting said oscillating signal to a DC voltage while said oscillator is providing said oscillating signal;

means coupled to said converting means for discharging said DC voltage while said oscillator is disabled;

a small signal transformer having a primary inductor and a secondary inductor, wherein said secondary inductor of said small signal transformer is coupled to the output of said oscillator;

a power switch coupled to said primary inductor of said small signal transformer, wherein when said power switch is off, said primary inductor of said small signal transformer is open circuited, enabling said oscillator to provide said oscillating signal, and when said power switch is on, said power switch shorts said primary inductor of said small signal transformer, thereby disabling said oscillator; and a switch coupled to said converting means and for coupling to the vital signal, wherein said switch is turned on grounding the vital signal when said converting means provides said DC voltage and wherein said switch is turned off, releasing the vital signal, when said converting means is discharged.

2. The power switching circuit of claim 1, wherein the vital signal is the compensation signal of the pulse width modulation circuit.

3. The power switching circuit of claim 1, wherein said converting means comprises:

a rectifier coupled to said oscillator for half wave rectifying said oscillating signal; and a capacitor coupled to said rectifier.

4. The power switching circuit of claim 1, wherein said discharging means comprises a resistor.

5. The power switching circuit of claim 1, wherein said voltage regulator includes a Zener diode.

6. The power switching circuit of claim 1, wherein said oscillator is a low frequency, low power oscillator.

7. The power switching circuit of claim 6, wherein said oscillator oscillates at a frequency between 10 to 20 kHz and generates a sine wave dissipating between 5 and 25 milliwatts of power.

8. The power switching circuit of claim 1, wherein said power switch comprises a single-pole, double-throw switch.

9. The power switching circuit of claim 1, wherein said switch includes a bipolar transistor.

10. A power switching circuit for turning on and off a power supply, the power supply including a power transformer having a primary and a secondary inductor, wherein the primary inductor is coupled to an unregulated DC input voltage and a pulse width modulation circuit for transferring power to an output circuit coupled to the secondary inductor of the power transformer, wherein the output circuit provides a feedback signal to a feedback compensation circuit, which develops a vital signal for controlling the pulse width modulation circuit, and wherein the power supply is turned off upon grounding the vital signal, but otherwise operates normally, said power switching circuit comprising:

a voltage regulator coupled to the unregulated DC input voltage for developing a low power DC signal;

an oscillator coupled to said voltage regulator for generating an oscillating signal;

means coupled to said oscillator for converting said oscillating signal to a DC voltage while said oscillator is providing said oscillating signal;

means coupled to said converting means for discharging said DC voltage while said oscillator is disabled;

a small signal transformer having a primary inductor and a secondary inductor, wherein said secondary inductor of said small signal transformer is coupled to the output of said oscillator;

a rectifier circuit coupled to said primary inductor of said small signal transformer for developing a DC power signal from an AC voltage developed across said primary inductor due to the oscillating signal applied to said secondary inductor of said small signal transformer;

a first switch coupled to said primary of said small signal transformer and receiving a pulse signal, wherein said first switch shorts said primary inductor of said small signal transformer while said pulse signal is asserted;

a multivibrator circuit coupled to said rectifier circuit receiving power from said DC power signal, wherein said multivibrator provides said pulse signal having a predetermined duration upon receiving a trigger signal;

a power switch coupled to said multivibrator providing said trigger signal when pressed;

a comparator coupled to said converting means providing a clock signal when said DC voltage is momentarily discharged and then recharged;

a flip-flop circuit coupled to said comparator, wherein said flip-flop circuit changes state upon receiving said clock signal; and a second switch coupled to said flip-flop circuit and for coupling to the vital signal, wherein said switch grounds the vital signal when said flip-flop is in a first state and wherein said switch releases the vital signal when said flip-flop is in a second state.

11. The power switching circuit of claim 10, wherein the vital signal is the compensation signal of the pulse width modulation circuit.

12. The power switching circuit of claim 10, wherein said converting means comprises:

a rectifier coupled to said oscillator for half wave rectifying said oscillating signal; and a capacitor coupled to said rectifier.

13. The power switching circuit of claim 10, wherein said voltage regulator includes a Zener diode.

14. The power switching circuit of claim 10, wherein said momentary power switch comprises a normally-open, momentary contact switch.

15. The power switching circuit of claim 10, wherein said multivibrator is a one-shot multivibrator.

16. The power switching circuit of claim 15, further comprising:

a resistor-capacitor circuit coupled to said multivibrator defining an RC time constant for determining the duration of said pulse signal.

17. The power switching circuit of claim 10, wherein said flip-flop circuit includes a D-type flip-flop.

18. The power switching circuit of claim 10, wherein said second switch includes a bipolar transistor.

* * * * *